(No Model.)
A. PALMROS.
ELECTRIC RAILWAY TROLLEY.
No. 504,113. Patented Aug. 29, 1893.
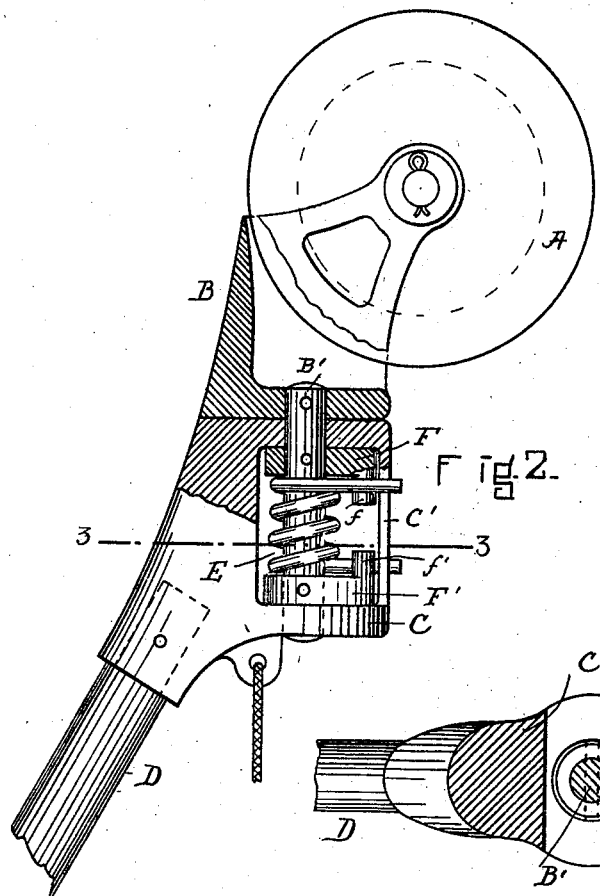
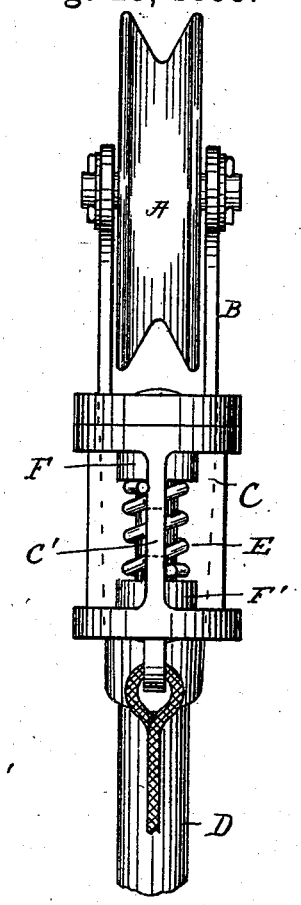
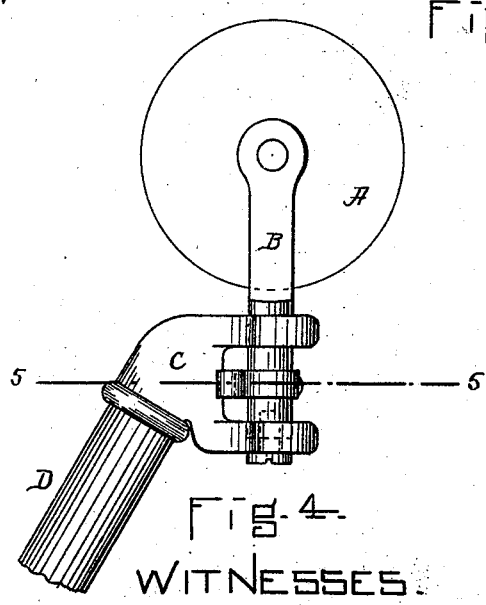
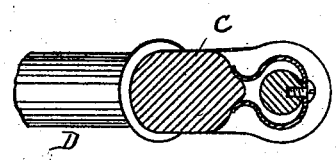
WITNESSES
Karl A. Andrén.
Chas. B. Brooks.
INVENTOR.
Alexander Palmros
by Alban Andrén
his ATT'Y.

UNITED STATES PATENT OFFICE.

ALEXANDER PALMROS, OF LYNN, MASSACHUSETTS, ASSIGNOR OF ONE-HALF TO VARNA J. PEIRCE, OF HUDSON, MAINE.

ELECTRIC-RAILWAY TROLLEY.

SPECIFICATION forming part of Letters Patent No. 504,113, dated August 29, 1893.

Application filed September 1, 1892. Serial No. 444,797. (No model.)

*To all whom it may concern:*

Be it known that I, ALEXANDER PALMROS, a citizen of Finland, and a resident of Lynn, in the county of Essex and State of Massachusetts, have invented new and useful Improvements in Trolley Devices, of which the following, taken in connection with the accompanying drawings, is a specification.

This invention relates to improvements in trolley devices for the purpose of allowing the trolley wheel to automatically adjust itself to the circuit wire especially when going around curved or inclined portions of the latter, or in passing switches, &c., thus preventing said trolley wheel from running off the wire, as will hereinafter be more fully shown and described reference being had to the accompanying drawings, where—

Figure 1 represents an end view of the improved trolley device. Fig. 2 represents a longitudinal section of the same partly shown in elevation. Fig. 3 represents a cross-section on the line 3—3 shown in Fig. 2. Fig. 4 represents a side elevation of a modification of the invention; and Fig. 5 represents a cross-section on the line 5—5 shown in Fig. 4.

Similar letters refer to similar parts wherever they occur on the different parts of the drawings.

A is the trolley wheel which is loosely journaled in the forked bearing B provided with a downwardly projecting pin or spindle B', adapted to turn in the forked socket C attached in a suitable manner to the trolley pole D as shown in the drawings.

In connection with the aforesaid trolley device I use a single spring for limiting the turning motion of the spindle B' in its bearings and I have for this purpose shown in Figs. 1, 2 and 3 a coiled spring E loosely surrounding the said spindle and having its ends bearing against opposite sides of a stop pin or projection C' secured to or forming a part of the socket C as shown in Figs. 1, 2 and 3.

On the spindle B' are secured a pair of projections $f$ and $f'$ against which the top and bottom ends of the spring E are held, said projections being preferably made as parts of the respective hubs or plates F, F' which are fastened in any suitable manner to the said spindle B' as shown. By means of the said single spring E, the forked bearing B carrying the trolley wheel A is held with a yielding pressure in its normal central position and allowed to yield according to the inclination or curvature of the circuit wire or switches thereon, thus preventing the trolley wheel from running off the wire, and causing it to be held in proper contact with it.

In Figs. 4 and 5 I have shown a modification of my device showing the single spring as attached to the spindle and having its ends bearing against any stationary part of the socket C, and in said Figs. 4 and 5 I have shown for this purpose a flat spring, but a coiled spring may be equally useful and serviceable, without departing from the essence of my invention.

Having thus fully described the nature, construction, and operation of my invention, I wish to secure by Letters Patent and claim—

1. The herein described trolley device consisting of a trolley wheel having its spindle loosely journaled in a bearing on the trolley pole, combined with a double acting single spring arranged on said spindle and having its ends pressing against the spindle bearing substantially as and for the purpose set forth.

2. The herein described trolley device consisting of a trolley wheel having its spindle loosely journaled in a bearing on the trolley pole combined with a coiled spring loosely arranged on said spindle, projections secured to the latter and a stop projection on the trolley pole socket substantially as and for the purpose set forth.

In testimony whereof I have signed my name to this specification, in the presence of two subscribing witnesses, on this 20th day of August, A. D. 1892.

ALEXANDER PALMROS.

Witnesses:
ALBAN ANDRÉN,
VARNA J. PEIRCE.